United States Patent [19]

Sano et al.

[11] Patent Number: 4,942,836
[45] Date of Patent: Jul. 24, 1990

[54] LIQUID CRYSTAL INDICATING DEVICE IN A SEWING MACHINE

[75] Inventors: Yasuro Sano; Takashi Nakamura, both of Tokyo, Japan

[73] Assignee: Janome Sewing Machine Co., Ltd., Tokyo, Japan

[21] Appl. No.: 269,953

[22] Filed: Nov. 10, 1988

[30] Foreign Application Priority Data

Nov. 11, 1987 [JP] Japan ................................ 62-171397

[51] Int. Cl.$^5$ ................................................. D05B 3/02
[52] U.S. Cl. ...................................... 112/445; 112/458
[58] Field of Search ............... 112/458, 445, 456, 457, 112/453, 454, 121.12, 121.11

[56] References Cited

U.S. PATENT DOCUMENTS 4,499,836 2/1985 Meier et al. .......................... 112/445
4,664,047 5/1987 Sano .................................. 112/456 X Primary Examiner—Peter Nerbun
Attorney, Agent, or Firm—Michael J. Striker

[57] ABSTRACT

A sewing machine which stores in a memory stitching control signals for forming stitched patterns, is provided with a stitching pattern indicating device which includes the following: a pattern selecting means for selecting desired patterns from a plurality of stitching patterns; a first indicating memory for storing indication signals in response to stitching patterns selected by means of the pattern selecting means; a manually controlling means for altering forming information of the selected patterns; a second indicating memory for storing indication signals of the stitch forming information adjusted by means of the manually controlling means, and an indicating means connected to the both indicating memories and indicating in response to the selection of the stitching patterns and to the alteration of the stitch forming information.

3 Claims, 4 Drawing Sheets c—"Width of letter"  d—"Length of letter"

a—"Stitch width"   b e—"Width of pattern"   g—"Elongation magnific."

a—"Stitch width"   b—"Feed amount"

h—"Basic needle posit."   b—"Feed amount"

c—"Width of letter"   d—"Length of letter"

i—"Darning stitch width"   j—"Feed amount cannot be changed"

e—"Width of pattern"   f—"Length of pattern"

k—"Needle position cannot be changed"   l—"Length of space"

LIQUID CRYSTAL INDICATING DEVICE IN A SEWING MACHINE

BACKGROUND OF THE INVENTION

The present invention relates to a sewing machine having a liquid crystal indicating or display device for a plurality of different patterns to be stitched.

With respect to a sewing machine storing many stitching patterns in an electronic memory and having a selecting means of patterns to be stitched, a control means of pattern forming information, and indicating means thereof, Japanese Patent Laid Open No. 55-116384 and many other publications have proposed sewing machines in which a plurality of different stitching patterns are selectable. According to those proposals, the information of the patterns to be stitched and the adjustment thereof is shown by pattern numbers and adjustment values in an indicator in response to operation of a pattern selecting means and a pattern adjusting means.

Each of the indications depends on common indicating instruments, because a space available in the front part of a machine frame is insufficient for installing both the pattern selecting means and the means for adjusting the pattern forming information.

Therefore, the pattern selecting means and the pattern adjusting means are arranged close to a common indicator including a liquid crystal display (LCD) or an indicating lamp.

However, in the sewing machine which is provided with the indicating lamp located near the operating means, the indication is often hindered by shadows of the operator's hands. When the same indicator is used for indicating many sorts of the pattern forming information, the indicating lamp could not clearly show contents to be indicated.

Therefore, it is an object of the invention to provide a sewing machine having an LCD indicator for clearly indicating the pattern forming information.

SUMMARY OF THE INVENTION

The present invention is to propose a liquid crystal indicating device to be provided in a sewing machine which stores stitching control signals in an electronic memory for forming stitched patterns, said device comprising a pattern selecting means for selecting desired patterns from a plurality of stitching patterns; a first indicating memory for storing indication signals in response to stitching patterns selected by means of the pattern selecting means; a manually controlled means for altering or adjusting the pattern forming information of the selected patterns; a second indicating memory for storing indication signals of the stitch forming information adjusted by means of the manually controlled means, and indicating means connected to the above mentioned first and second indicating memories to display information in response both to the selection of the stitching patterns and to the alternation of the pattern forming information.

DETAILED DESCRIPTION OF A PREFERRED EMBODIMENT

An embodiment of the invention will be explained with reference to the attached drawings.

Figure 1:
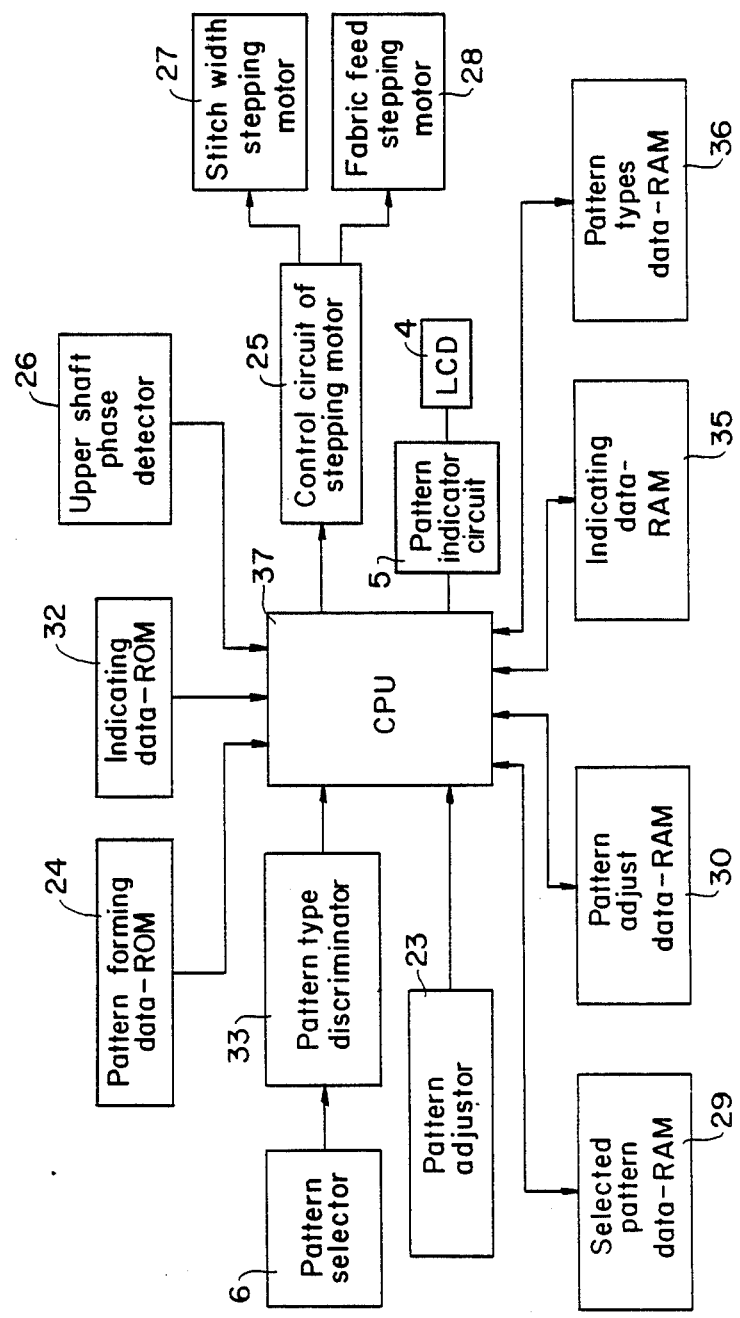
FIG. 1 is a control block diagram of an indicating device of the invention.
Figure 2:
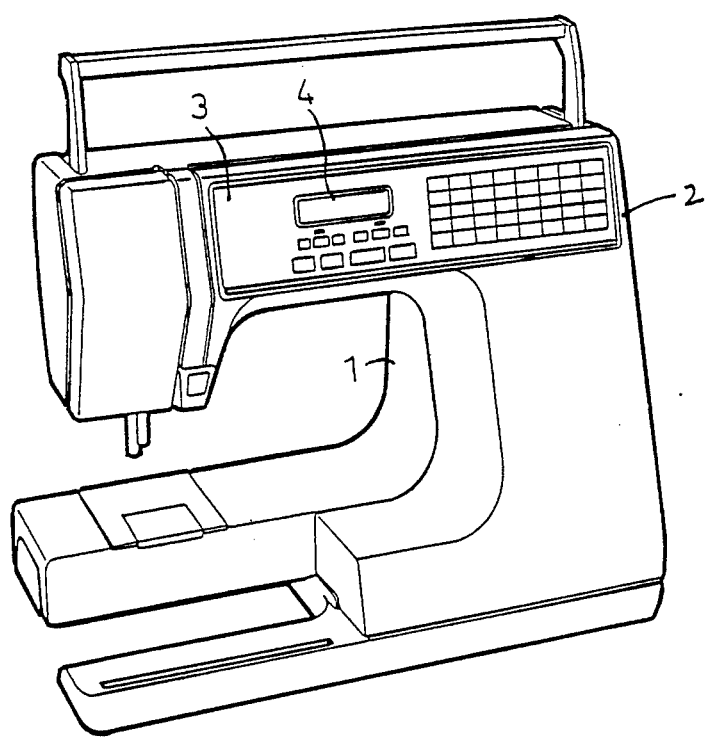
FIG. 2 is a perspective view of a sewing machine incorporated with the device of FIG. 1.

FIG. 2 shows that a machine frame 1 has a scale frame 2 on which a key board 3 is attached, and at a center of the key board 3 there is provided a liquid crystal display or indicator 4 connected to a pattern indicating circuit 5 as shown in FIG. 1.

In the key board 3, the reference numeral 6 denotes a pattern selecting means, and the keys provided in the key board 6 to select desired patterns include a monogram pattern key 7 for selecting monogram patterns represented by letters and figures, a straight stitching key 8, an abstract pattern key 9, a concrete pattern key 10, an adjustable elongation pattern key 11, a darning key 12, an intermittent stitching key 13, and a space key 14 for selecting a space between a series of patterns.

The numeral 23 designates a pattern formation adjusting means, where a stitch width key 15 is positioned under the liquid crystal indicator 4 and serves for adjusting the stitch width.

16 denotes an indicating lamp which is lighted when the stitch width key 15 is operated and indicates that the stitch width is made adjustable manually.

17 denotes an indexing-up key, and 18 denotes an indexing-down key, and when the stitch width key 15 is operated, the indexing-up and-down keys are operative and may be manually operated to adjust the stitch width.

19 denotes fabric feed key which is positioned under the indicator 4 in alignment with the stitch width key 15 and serves for making ready the manual adjustment of the fabric feed.

20 denotes an indicating lamp which is lighted when the fabric feed key 19 is operated for designating the fabric feed amount to be adjustable manually.

Keys 21 and 22 are indexing-up and indexing-down keys respectively, and when the fabric feed key 19 is operated, they become operative to manually adjust the fabric feed amount.

34 denotes a memory key operated for combining and storing a series of patterns in memory 29 when selected by operating the pattern selecting means 6.

38 denotes a cancel key for cancelling the above described combined and stored patterns.

Each of the means provided in the key board 3 is connected to the control device of the sewing machine as illustrated in FIG. 1.

24 denotes a memory of pattern forming data. The memory 24 stores data for setting a needle position and the selected feeding amount for forming stitched patterns.

25 denotes a stepping motor control circuit connected to a central processing unit 37, which is connected to a stitch width controlling stepping motor 27 and a feed amount controlling stepping motor 28 which are driven by signals issued from a detecting means 26 at specific phases of an upper shaft of the machine.

29 denotes a memory connected to the central processing unit 37 for storing pattern numbers of the patterns selected by the pattern selecting means 6.

30 denotes a memory connected to the central processing unit 37 for storing values manually adjusted by the pattern forming means 23.

32 denotes a memory of indicating data, connected to the central processing unit 37.

33 denotes a discriminating means of pattern sorts, positioned between the pattern selecting means 6 and the central processing unit 37.

Actuations of the present device will be explained.

The monogram pattern key 7 of the pattern selecting means 6 is operated to select the Japanese Letter "あ", for example. The discriminating means 33 of the pattern sorts issues to CPU a signal that the selected letter is "monogram pattern" and transmit "あ" thereto concurrently. CPU stores the corresponding pattern number in the memory 29, reads out the indication data from the data memory (ROM) 32, writes it into the indication data memory (RAM) 35, outputs the data to the indication circuit 5, and indicates the letter "あ" in the liquid crystal indicator 4 as seen in FIG. 4.

When the controller is operated to start the sewing machine, CPU reads out in succession the data from the memory (ROM) 24 at the specific phases of the upper shaft detected by the detecting means 26. The stepping motor control circuit 25 drives the stitch width stepping motor 27 and the fabric feed stepping motor 28 for stitching the pattern.

If a series of letters are stitched, the monogram pattern key 7 is operated as mentioned above and subsequently the memory key 34 is operated. CPU stores the pattern number in the memory 29, reads out the indication data from the data memory (ROM) 32, stores the data in the indication data memory (RAM) 35, operates the indication circuit 5, and indicates them in the liquid crystal indicator 4. The next letter is selected by operating the pattern selecting means 6, and the memory key 34 is operated.

Figure 4:
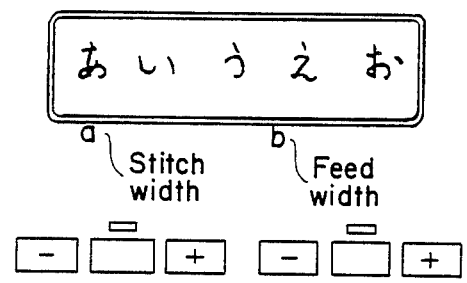
FIG. 4 shows LCD indicator when a stitching pattern is selected.

In this matter, the letters "あいう" are succesively input in CPU and indicated on indicator 4 as shown in FIG. 4. When the controller is operated under this condition, the letter "あ" is stitched at first, then the next letter "い" is stitched, and the letters are read out in the order of memorization in the memory 29 from the memory (ROM) 24. The stitch width stepping motor 27 and the fabric feed stepping motor 28 are operated by the signals from the stepping control circuit 25 for forming the stitches.

An adjustment of forming pattern will be explained.

When the series of patterns are dealt with by operating the pattern selecting means 6, the means 33 discriminates that the patterns are serial ones. CPU stores the pattern type in the memory (RAM) 36, stores a number of the selected pattern in the memory (RAM) 29, stores the indication data of the patterns in the indication data memory (RAM) 35, and indicates the pattern in the liquid crystal indicator 4.

Figure 5:
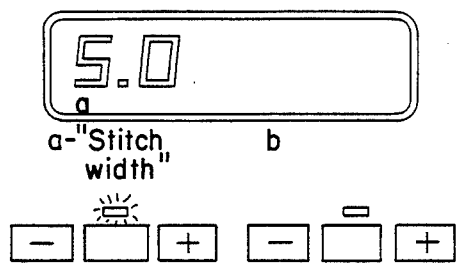
FIG. 5 shows LCD indicator when a stitch width key is operated.

The lamp 16 is lighted by operating the stitch width key 15 of the pattern adjusting means 23, and indicates, in the indicator 4 as shown in FIG. 5, the needle amplitude data of the selected pattern stored in the indication data memory (RAM) 35.

In FIG. 5, the indication "5.0" is a needle amplitude value telling the width of the stitch; the memory 36 stores the type of the serial pattern, and the "Width of stitch" symbol "a" is indicated under "5.0". When the indicated needle amplitude or stitch width value is to be decreased the indexing-down key 18 is operated to decrease "5.0". If the value is to be increased, the indexing-up key 17 is operated to reach a value, e.g., "7.0" as shown in FIG. 6.

Figure 6:
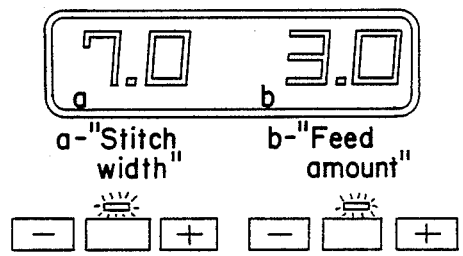
FIG. 6 shows LCD indicator when a fabric feed key is operated.

The lamp 20 is lighted by operating the fabric feed designating key 19 of the pattern adjusting means 23, and indicates, in the indicator 4, as shown in FIG. 6, the fabric feed data of the selected pattern stored in the indication data memory (RAM) 35.

In FIG. 6, the indication "3.0" is a fabric feed amount indicative of dense (or coarse) stitches. When the indicated feed amount is to be decreased, the indexing-down key 22 is operated to decrease the figure, and when it is to be increased, the indexing-up key 21 is operated.

The memory (RAM) 30 of the adjusted value stores the above mentioned indication.

The liquid crystal indicator 4 indicates the patterns stored in the indication data memory (RAM) 35 by again operating the stitching width key 15 and the fabric feed designating key 19 after adjustment.

Figure 3:
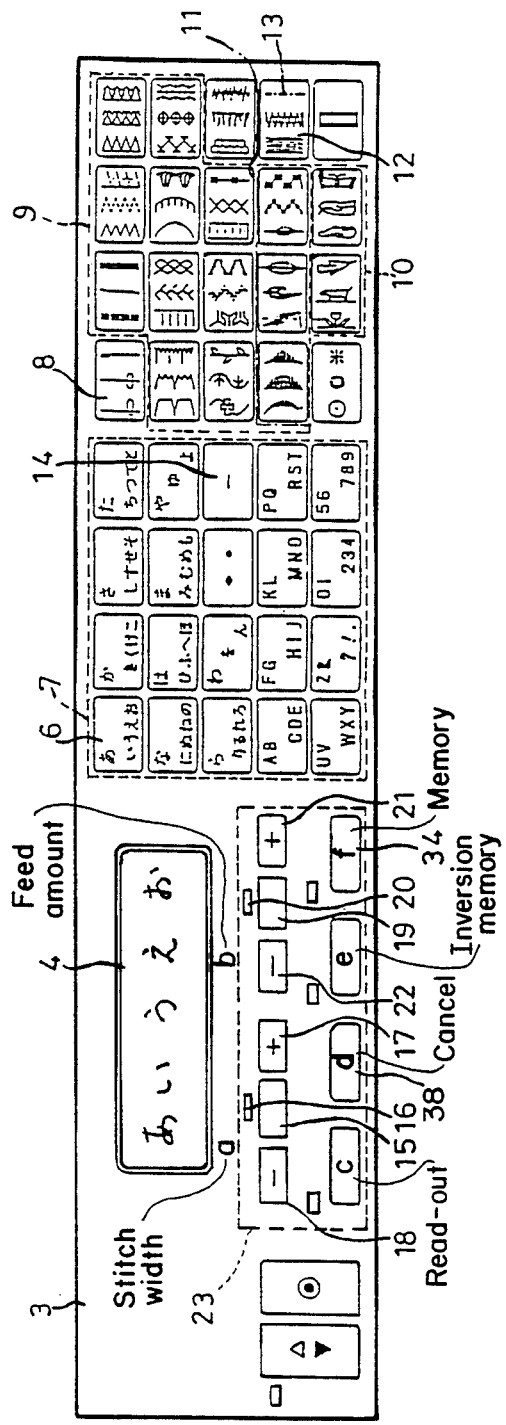
FIG. 3 is a plan view of a key board in the device of FIG. 2.

When the controller is operated to drive the sewing machine after the above described adjustments, CPU reads out the data stored in the memory (ROM) 24 per each of the needle droppings, converts the data by the adjusted values in the memory (RAM) 30 and issues an output to the stepping motor control circuit 25 so as to drive the stitch width stepping motor 27 and the fabric feed stepping motor 28 for producing the adjusted patterns. When the pattern is serial as shown in FIG. 3, and when the monogram pattern key 7 is operated, the means discriminates that the selected pattern is a monogram type. CPU stores this type in the memory (RAM) 36, stores a number of the selected pattern in the memory (RAM) 29 of the selected pattern, stores the indication data of the patterns in the indication data memory (RAM) 35, and indicates the pattern in the liquid crystal indicator 4.

Figure 7:
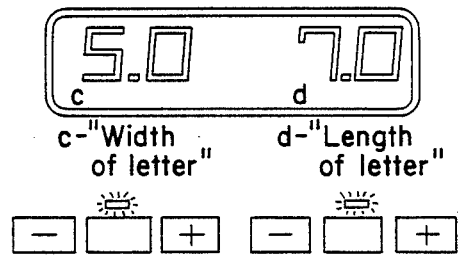
FIG. 7 shows LCD indicator when a monogram pattern is selected.

The lamp 16 is lighted by operating the stitch width key 15, and CPU indicates as shown in FIG. 7 the needle amplitude data of the selected pattern stored in the indication data memory (RAM) 35. In FIG. 7, the indication "5.0" denotes a needle amplitude value defining the "Width of letter"; the memory 36 stores the monogram patterns and the "Width of letter" symbol "c" is indicated under "5.0". An explanation for the adjustment of the amplitude value is omitted, since it is the same as the above stated serial patterns.

The lamp 20 is lighted by operating the fabric feed designating key 19, and CPU indicates, in the indicator 4 as shown in FIG. 7, the feed data of the selected pattern stored in the indication data memory (RAM) 35. An indication "7.0" denotes a length of a letter to be stitched and the "Length of letter" symbol "d" is indicated by "7.0". When the length of the letter is to be decreased, the indexing-down key 22 is operated to decrease the value, and when it is to be increased, the indexing-up key 21 is operated.

A further explanation will be made to a pattern selection by the abstract pattern key 9 and the concrete pattern key 10. The means 33 discriminates that the selected pattern is an abstract one or a concrete one. CPU stores it in the memory (RAM) 36, stores the number of the selected pattern in the memory (RAM) 29, stores the indication data of the pattern in the indication data memory (RAM) 35, and indicates a shape of the selected pattern in the liquid crystal indicator 4.

Figure 8:
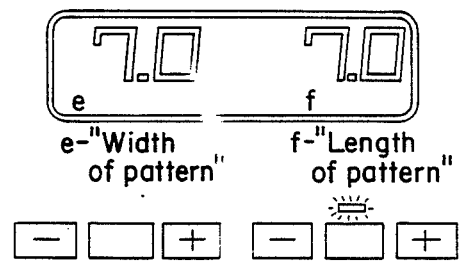
FIG. 8 shows LCD indicator when an abstract pattern and a concrete pattern are selected.

The lamp 16 is lighted by operating the stitch width key 15, and CPU indicates as shown in FIG. 8 the needle amplitude data of the selected pattern stored in the indication data memory (RAM) 35.

In FIG. 8, the indication "7.0" is a needle amplitude value defining the "Width of pattern"; the memory 36 stores the abstract pattern or the concrete pattern and the "Width of pattern" symbol "e" is indicated under "7.0".

The lamp 20 is lighted by operating the fabric feed designating key 19. Since the feed data for dense stitches of the elected pattern is stored in the indication data memory (RAM) 35, the central processing unit CPU indicates the length as "7.0" as shown in FIG. 8.

In FIG. 8, the indication "7.0" indicates the "Length of pattern" to be formed. Explanations for the adjustment of the pattern width and length are omitted, since those are the same as the above stated serial patterns.

A still further reference will be made to the pattern selection by the adjustable elongation pattern key 11.

The means 33 discriminates that the selected pattern is an adjustable elongation pattern, and CPU stores this information in the memory (RAM) 29, stores the indication data of the patterns in the indication data memory (RAM) 35, and displays the pattern on the liquid crystal indicator 4.

Figure 9:
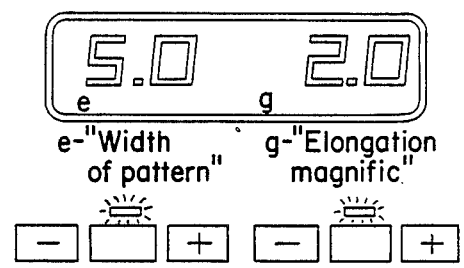
FIG. 9 shows LCD indicator when an adjustable elongation pattern is selected; p

The lamp 16 is lighted by operating the stitch width key 15 of the pattern adjusting means 23, and indicates, in the indicator 4 as shown in FIG. 9, the needle amplitude data of the selected pattern stored in the indication data memory (RAM) 35.

In FIG. 9, the indication "5.0" is a needle amplitude value defining the width of the pattern. The memory 36 stores the type of the adjustable elongation patterns and the "Width of the pattern" symbol "e" is indicated by "5.0".

The lamp 20 is lighted by operating the fabric feed designating key 19; since a feed to be made is for the dense stitches, a determined magnification of the elongation is indicated by "2.0" as seen in FIG. 9.

Explanations for the adjustment of the pattern width and the magnification of the elongation are omitted, since those are the same as in the above described serial patterns.

Another reference will be made to the pattern selection by the straight stitching key 8 as shown in FIG. 2.

The means 33 discriminates that the selected pattern includes straight stitches, and CPU stores this pattern type in the memory (RAM) 36 and also a number of the selected pattern in the memory (RAM) 29, stores the indication data of the patterns in the indication data memory (RAM) 35, and indicates the pattern in the liquid crystal indicator 4.

Figure 10:
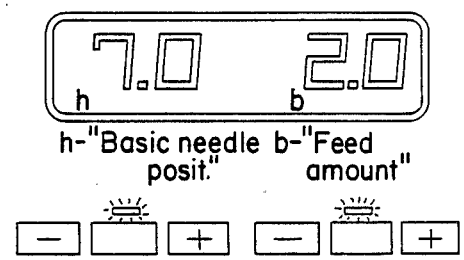
FIG. 10 shows LCD indicator when a darning and an intermittent stitching are selected.

The lamp 16 is lighted by operating the stitching width key 15 of the formed pattern adjusting means 23, and CPU indicates, in the indicator 4 as shown in FIG. 10, the needle amplitude data of the selected pattern stored in the indication data memory (RAM) 35.

In FIG. 10, the indication "7.0" is a needle amplitude value defining a basic or reference needle position. Since the memory 36 stores the straight stitched patterns, the "Reference needle position" is indicated under the "7.0".

The lamp 20 is lighted by operating the fabric feed designating key 19. CPU indicates as shown in FIG. 10 a determined length of a feed to be made as "2.0" in the feed data of the selected pattern stored in the memory (RAM) 35.

In FIG. 10, the indication "2.0" denotes the "Straight stitch fabric feed".

An explanation of the adjustment of the reference needle position and the straight stitch fabric feed will be omitted, since it is the same as that in the above described serial pattern.

An explanation will be made to the pattern selection by darning key 12 and intermittent stitching key 13.

The means 33 discriminates that the selected pattern includes darning or intermittent stitching, and CPU stores this pattern type in the memory (RAM) 36, stores a number of the selected pattern in the memory (RAM) 29, stores the indication data of the pattern in the indication data memory (RAM) 35 and indicates the pattern in the liquid crystal indicator 4.

Figure 11:
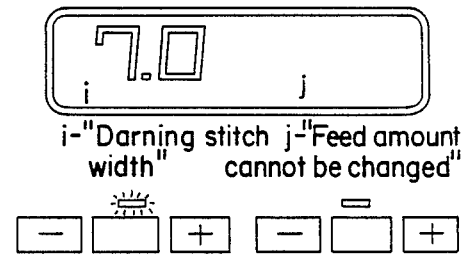

The lamp 16 is lighted by operating the stitch width key 14, and CPU indicates, in the indicator 4 as shown in FIG. 11, the needle amplitude data of the selected pattern stored in the indication data memory (RAM) 35.

In FIG. 11, the indication "7.0" is a needle amplitude value defining the "Darning width". Since the memory 36 stores the darning or intermittent stitching patterns, the "Darning width" is indicated by "7.0".

The lamp 20 is lighted by operating the fabric feed designating key 19, and CPU indicates the feed data of the selected pattern stored in the indication data memory (RAM) 35, but since the fabric is not transported the "Fabric feed cannot be changed" is indicated.

The adjustment of the pattern width is the same as the serial pattern, and an explanation will be omitted.

An explanation will be made to the pattern selection by the space key 14.

The means 33 discriminates that the pattern is a space pattern. CPU stores this pattern type in the memory (RAM) 36, stores a number of the selected pattern in the memory (RAM) 29, stores the indication data of the patterns in the indication data memory (RAM) 35, and indicates the pattern in the liquid crystal indicator 4.

Figure 12:
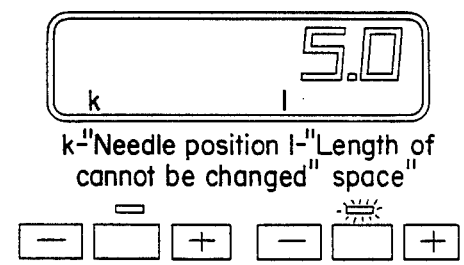
FIG. 12 shows LCD indicator when a space stitching is selected.

The lamp 16 is lighted by operating the stitch width key 15 of the formed pattern adjusting means 23, and CPU indicates, in the indicator 4 as shown in FIG. 12, the needle amplitude data of the selected pattern stored in the indication data memory (RAM) 35. Since the pattern stored in the memory 36 of the pattern sort is the space pattern, the needle amplitude value must be fixed, and "Needle position cannot be changed" is indicated.

The lamp 20 is lighted by operating the fabric feed designating key 19, and the feeding length to be made is indicated as "5.0" in the indicator 4 as shown in FIG. 12, according to the feed data of the selected pattern stored in the indication data memory (RAM) 35. Since the indication "5.0" is a length of a space to be formed, "Length of space" is indicated under the "5.0".

An explanation to the adjustment of the space length is omitted, since it is the same as the above described serial pattern.

What is claimed is:

1. A sewing machine having a pattern data memory (24) for storing data of a plurality of different types of patterns which are selectively read out to control stitch forming means including a vertically reciprocating and laterally swingable needle and a fabric feeding device, and an indication data memory for storing data indicating a selected pattern in a display,
the sewing machine comprising:
   (a) pattern selecting means including a plurality of keys selectively operated to select a pattern from said pattern data memory;
   (b) discriminating means (33) responsive to operation of a pattern selecting key to discriminate a type of the selected pattern and to produce corresponding pattern type data;
   (c) adjusting means (23) including two pairs of input keys selectively operated to produce data for adjusting selected patterns in predetermined modes each specific to the types of the selected patterns;
   (d) first memory means (29) for temporally storing data for a selected pattern;
   (e) second memory means (30) for temporally storing data for adjusting the selected pattern;
   (f) third memory means (35) for temporally storing indication data for the selected pattern;
   (g) fourth memory means (36) for temporally storing the data representing a type of the selected pattern;
   (h) a central processing unit (CPU) responsive to a pattern type discriminating operation of said discriminating means to read out the pattern data and the pattern indication data from said pattern data memory (24) and said indication data memory (32) respectively, and to store said pattern data and said indication data in said first and third memory means, respectively, while operating said display (4) to indicate the selected pattern thereon, and simultaneously store said pattern type data of the selected pattern in said fourth memory means (36), said central processing unit being responsive to selective operation of said adjusting means to write said pattern adjusting data into said second memory means in reference to said pattern type data stored in said fourth memory means, and simultaneously to read out indication data for said pattern adjusting data from said indication data memory and to write the same into said third memory means while operating said display to indicate thereon said pattern adjusting data, and said central processing unit processing the data stored in said first, second and fourth memory means to control said stitch forming means.

2. The sewing machine as defined in claim 1, wherein said two pairs of input keys are indexing up and indexing down keys which are operated to produce digital signals.

3. The sewing machine as defined in claim 1, further comprising operating keys selectively operated to provide descriptive indication in said display on the basis of said pattern type data stored in said fourth memory means.

* * * * *